United States Patent [19]

Bingham

[11] Patent Number: 5,025,469
[45] Date of Patent: Jun. 18, 1991

[54] METHOD AND APPARATUS FOR REDUCING THE TURN-AROUND TIME IN FACSIMILE TRANSMISSION

[76] Inventor: John A. C. Bingham, 2353 Webster St., Palo Alto, Calif. 94301

[21] Appl. No.: 475,455

[22] Filed: Feb. 6, 1990

[51] Int. Cl.$^5$ ............................................. H04M 11/00
[52] U.S. Cl. ...................................... 379/98; 379/100; 375/8
[58] Field of Search ...................... 379/98, 100, 96, 97; 375/8, 9, 121; 358/437

[56] References Cited

U.S. PATENT DOCUMENTS 3,737,776  6/1973  Fletcher et al. ........................ 370/11
4,551,581  11/1985 Doughty ............................... 379/201
4,727,429  2/1988  Ueno ..................................... 358/405
4,856,030  8/1989  Batzer et al. ............................ 375/8
4,894,847  1/1990  Tjahjadi et al. ......................... 375/8

FOREIGN PATENT DOCUMENTS 0190041  7/1989  Japan ..................................... 375/8

Primary Examiner—Jin F. Ng
Assistant Examiner—Ahmad F. Matar
Attorney, Agent, or Firm—Allston L. Jones

[57] ABSTRACT

Previously recommended methods of transmitting facsimile data on the telephone network resulted in periods of time when there is no signal present in the network; one consequence of this was that the retraining time required for the facsimile modem's receiver after each quiet period was undesirably long. This problem is solved by the high-speed transmitter sending two or more holding tones whenever it is not sending training or facsimile signals; these tones prevent re-routing of a telephone connection and allow the high-speed receiver to continue to track data clock and carrier frequencies, thereby considerably reducing the time required for retraining.

7 Claims, 4 Drawing Sheets

METHOD AND APPARATUS FOR REDUCING THE TURN-AROUND TIME IN FACSIMILE TRANSMISSION

FIELD OF THE INVENTION

The invention pertains generally to transmission over the General Switched Telephone Network (GSTN) of data signals that have been encoded so as to carry facsimile information, and, more particularly, to transmission according to half-duplex procedures such as are described in Recommendations T.4 and T.30 of the Consultative Committee for International Telephone and Telegraph (CCITT).

BACKGROUND OF THE INVENTION

Establishment of a connection on the GSTN between two facsimile devices, and the transfer of data from one to the other according to T.4 and T.30 is at present performed by modems working in an unusual half-duplex mode; that is, high-speed facsimile data is transmitted in one direction alternately with low-speed control and acknowledgement signals in the other direction. As a result, the high-speed receiver must be retrained before each batch of high-speed data can be sent; as the speed capabilities of modems are continually improved the time required for training becomes an increasingly significant proportion of the total transmission time.

Furthermore, there will be periods of time when no signals in either direction are present in the network, and the connection may be re-routed; this would further increase the time needed for retraining.

SUMMARY OF THE INVENTION

In accordance with the preferred embodiment of the present invention, the problem of increased training time for the high-speed receiver is solved by the high-speed transmitter sending at least two holding tones whenever it is not sending facsimile data. These tones prevent quiet periods and consequent re-routing of a connection; they can also be used to allow uninterrupted tracking of the data clock and carrier frequencies, and much faster training of the high-speed receiver.

In other embodiments other numbers of holding tones might be used.

DESCRIPTION OF PREFERRED EMBODIMENT

Prior Art

Figure 1:
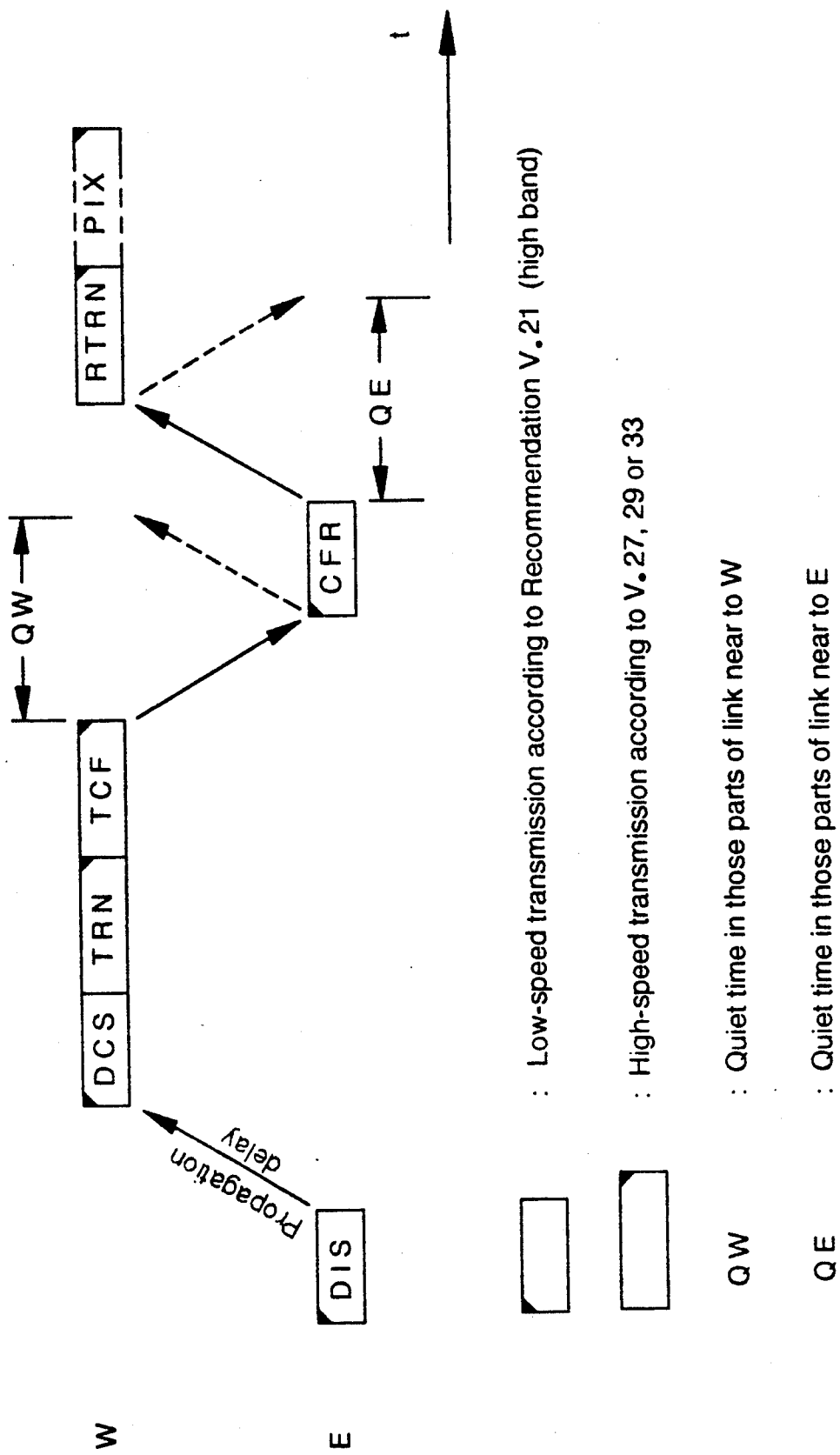
FIG. 1 shows a conventional sequence of signals transmitted between the modems of two typical facsimile machines according to the prior art of Recommendations T.4 and T.30, and the resultant quiet periods. For ease of reference the machines are identified as W (West) and E (East), and it is assumed that facsimile data is to be transmitted from W to E, with only low-speed control and acknowledgement data going from E to W.
Figure 2:
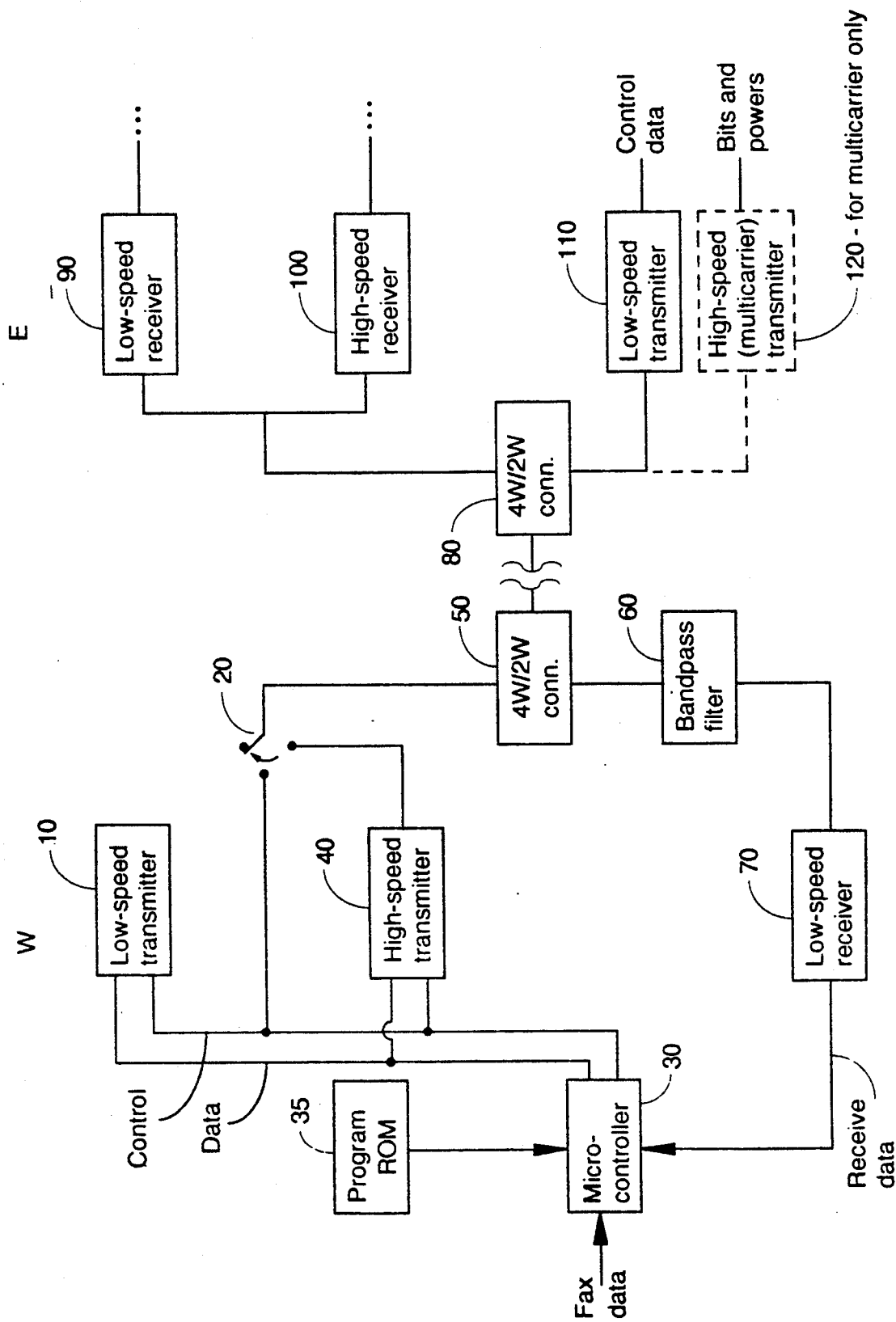
FIG. 2 is a typical block schematic diagram of the two transmitters and receivers of both modems connected through four-wire to two-wire converters (4W/2W) to a two-wire line.

The sequence of events for the establishment of a connection on the GSTN and the transmission and reception of a facsimile-encoded page is shown in FIG. 1; the interconnection of the required transmitters, receivers, and a controller 30 and its associated memory 35 is shown in FIG. 2. The following sequence is activated by controller 30.

(a) The called device, E, responds to a ring signal by sending as control data a Digital Identification Signal (DIS) which defines its capabilities (type of high-speed modem, etc.); it uses a low-speed Frequency Shift Keying (FSK) transmitter 110 as defined by Recommendation V.21, channel No. 2.

(b) The calling device, W, decides which capabilities are to be used, sets switch 20 to the low-speed position, and returns a Digital Command Signal (DCS), using its low-speed, FSK transmitter 10 also in the V.21 high band. It then moves switch 20 to the high-speed position, and transmits from high-speed transmitter 40 a training signal (TRN) followed by a Training Check (TCF) and then silence.

(c) E receives DCS in its low-speed receiver 90, configures its high-speed receiver 100 accordingly, trains its high-speed receiver 100 with TRN, and then analyzes the quality of the connection by noting the number of errors in the received TCF signal; if the quality is deemed adequate E sends Confirmation to Receive (CFR) using its low-speed transmitter 110 in channel No. 2 of V.21 as before.

Figure 3:
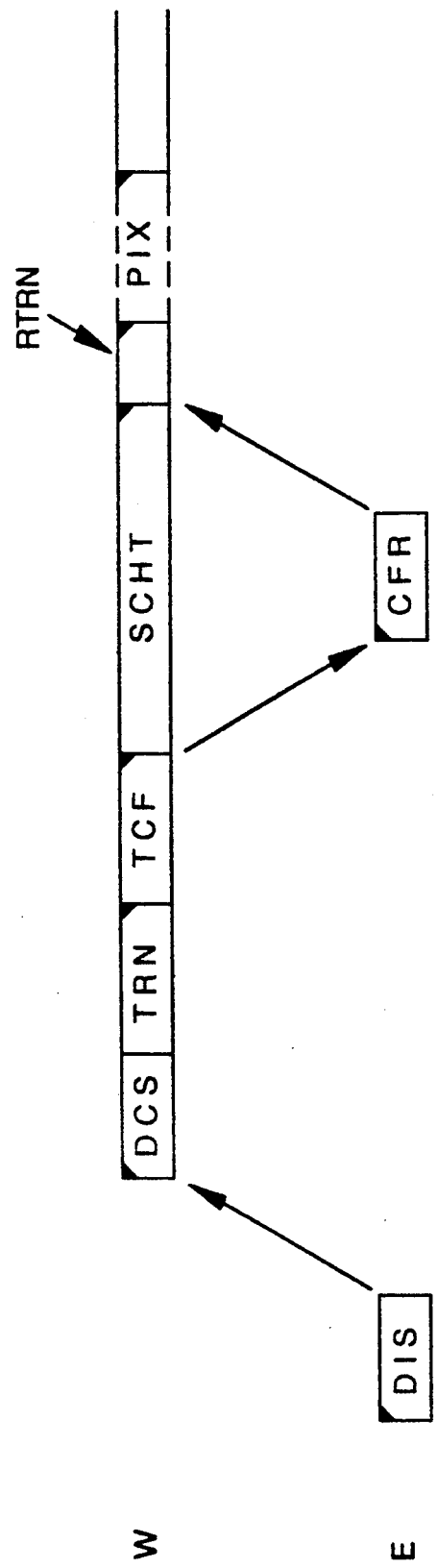
FIG. 3 shows a sequence of signals transmitted between two modems W and E according to one embodiment of the present invention.
Figure 4:
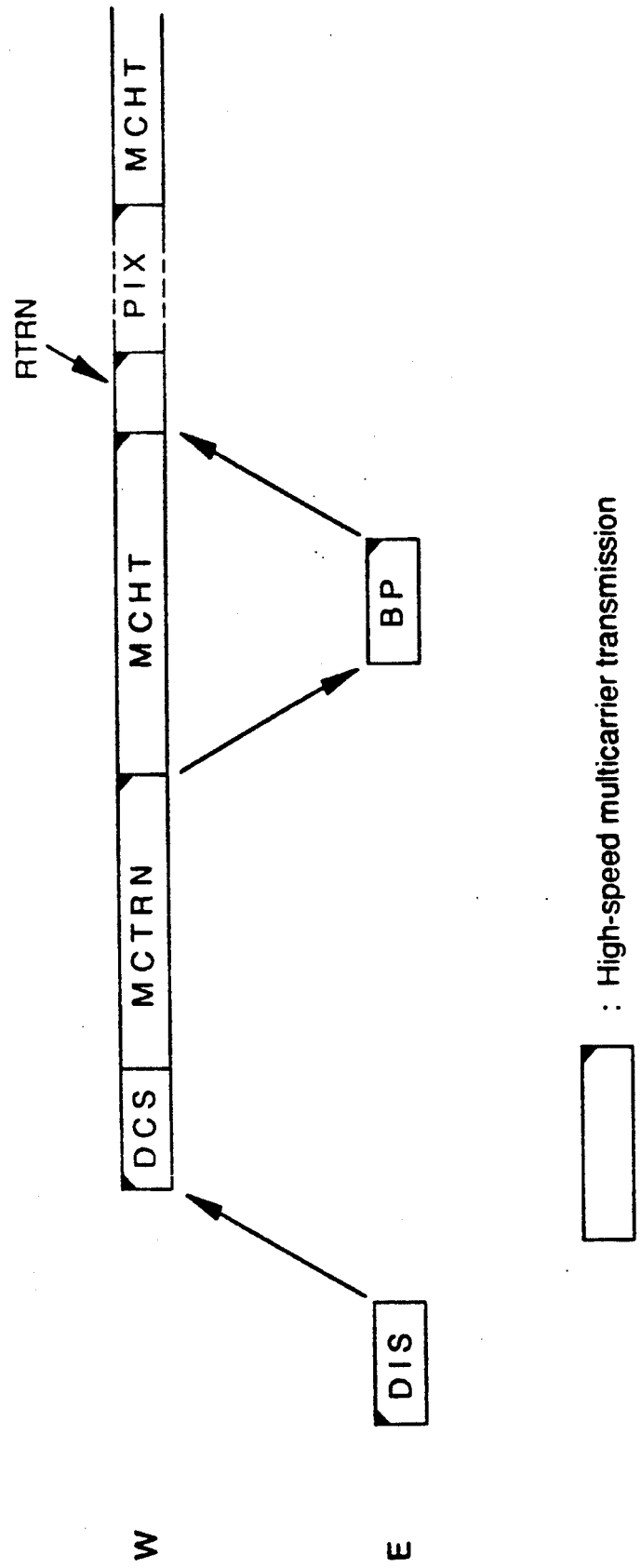
FIG. 4 shows a sequence of signals transmitted between modems W and E according to a second embodiment of the present invention, which would be appropriate for use with a multicarrier-modulated signals.

(d) W sends a retrain signal, and follows it with facsimile data (shown as "Pix"—for pixel—in FIGS. 1, 3, and 4).

(e) If, however, the quality of TCF is deemed inadequate E would send a Failure To Train (FTT), and W would set its high-speed transmitter to a lower speed and send TCF again.

It can be seen that at both ends of the connection (that is, near devices W and E) there are periods of time when there is no signal on the line. These periods are equal to the round-trip delay from W to E and back to W; for long-distance communication via satellites this can be as much as 1.2 seconds.

These quiet periods may have several adverse consequences for facsimile transmission; two such consequences are:

1. in order to make most efficient use of their equipment, some long-distance carriers may time-share transmission facilities between customers; when there is a quiet period on any channel that channel may be reassigned to another customer if that period exceeds the threshold period established by the common carrier. As a result, when the original modem pair W and E start retransmitting they may be assigned a different channel with different transmission characteristics. High-speed modems must very precisely learn and compensate for channel characteristics, and this switching may dictate a longer training time of the high-speed receiver in E than would have been needed if the channel had not been reassigned;

2. in addition to compensating for channel characteristics, a receiving modem must also compensate for frequency differences between the clocks in transmitting and receiving modems, and for any frequency shift introduced by the channel (usually referred to as clock and carrier offsets). This is usually done by using phase-locked loops (PLL) of some type, but PLLs will generally not be able to hold lock during prolonged periods of quiet. Consequently, when W starts retransmitting it may have to send a longer preamble to its training signal in order to allow the PLLs in E to reacquire lock, and the retrain phase (RTRN) may be almost as long as the original train.

Both of these effects are becoming more important as both the amount of data to be transmitted and the potential speeds of modems are increased. As modem speeds increase the required precision of training also increases, so more time may have to be allowed for training; as speeds increase, however, the time required for transmission of the facsimile information decreases, so that the relative amount of time required for training doubly increases.

The Present Invention

Single-carrier Modulation

The fact that modem E has to transmit only a small amount of data, and does it slowly using only the narrow bandwidth of a V.21 high-band signal presents an opportunity for a previously unrecognized improvement.

When W's high-speed transmitter 40 has finished TCF it should transmit at least two "holding" tones, with at least one at each of the edges of its frequency band; this Single-Carrier Holding Tone (SCHT) segment is shown in FIG. 3. These tones prevent quiet periods in the network, and also are ideally suited to maintaining carrier and clock lock in E's receiver. For the modulation methods recommended in T.30 the frequencies of these tones are:

| | |
|---|---|
| V.27 | 1000 and 2600 Hz |
| V.29 | 500 and 2900 Hz |
| V.33 and other high-speed fax modems | 600 and 3000 Hz |

The tones can be generated by turning off the scrambler of W and (a) when using V.27 or V.29 modulation, setting the transmit data to repeated ONES, or (b) when using V.33 or other single-carrier high-speed modulation methods, by also turning off the trellis coding and transmitting repeated ACAC alternations as defined, for example, in FIG. 3 of Recommendation V.33.

Upon detecting the end of TCF and deciding that the number of errors is acceptable, E should send CFR (using high-band V-21), turn off the adaptation of its equalizer and continue to track clock and carrier using SCHT.

While transmitting SCHT W's low-speed receiver 70 awaits reception of a CFR (or FTT) signal from E. These signals are Frequency Shift Keyed (FSK) between 1650 and 1850 Hz, so they can be easily separated from the reflected holding tones using a band-pass filter 60, which has a passband approximately 300 Hz wide centered about 1750 Hz and is designed and implemented by any one of several methods well known in the art.

Upon receiving CFR W should stop transmitting SCHT, and send a very short retrain sequence before transmitting pixel information. From then on until the call is disconnected, W must not stop transmitting; whenever it is awaiting a reply from E it must transmit the holding tones.

Multicarrier Sequence

For multicarrier modulated signals (see, for example, Hughes-Hartogs, U.S. Pat. Nos. 4,679,227, 4,731,816, and 4,833,706) the T.30 sequence should be modified as shown in FIG. 4. The relevant differences from the single-carrier sequence of FIG. 3 are as follows.

(a) The TCF segment is not needed because the multicarrier training algorithm described by Hughes-Hartogs chooses the data speed to ensure a defined and acceptable error rate.

(b) There is considerably more training information (the bits and power assignments) that must be sent from E to W. It is desirable that high speed communication be used for this purpose, so E must also include a high-speed, multicarrier, transmitter as shown by the dashed lines in FIG. 2; the low-speed CFR signal of FIG. 3 is replaced by the high-speed BP signal of FIG. 4.

(c) In order to use as much of the available bandwidth as possible for the BP signal it is preferable that the holding tones be at quite low frequencies (375 and 625 Hz were used in the first embodiment); this signal is shown as MCHT in FIG. 4.

(d) Because of the ensured error rate there is never a "failure to train", and the TRN/FTT/TRN sequence cannot occur.

It will be apparent to those skilled in the art that the invention disclosed herein may be embodied in other specific forms without departing from the spirit and essential characteristics thereof. Accordingly, the disclosure of the present invention is intended to be illustrative, but not limiting of the scope of the inventions which is set out in the following claims.

What is claimed is:

1. In a device for sending facsimile data via a communication link from a source modem to a destination modem, each including a receiver and a transmitter, using a half-duplex protocol whereby, in sequence, said source modem sends a signal to said destination modem to synchronize and train its receiver, said destination modem sends a command signal back to said source modem, and said source modem sends a resynchronizing and retraining signal followed by data, a method of preventing the re-routing of some sections of said communication link and speeding the resynchronization and retraining of the receiver of said destination modem, said method comprising the steps of:

recognizing the beginning and end of the time periods when said source modem is awaiting a response from said destination modem or is receiving and decoding said response; and transmitting, during said periods, a holding signal that occupies one or two bands of frequencies separate from that occupied by said command signal.

2. The method of claim 1 wherein said holding signal comprises two tones, which are generated by constraining the data input to the transmitter of said source modem to be a simple repetitive pattern.

3. The method of claim 2 in which the frequency of one of said two tones that are generated is below the frequency band occupied by said command signal, and the other is above.

4. The method of claim 2 in which said tones are unmodulated carriers of a multicarrier set.

5. An apparatus in a device for sending facsimile data via a communication link from a source modem to a destination modem, each having a receiver and a transmitter, using a half-duplex protocol whereby, in sequence, said source modem sends a signal to said destination modem to synchronize and train its receiver, said destination modem sends a command signal back to said source modem, and said source modem sends a resynchronizing and retraining signal followed by data, an apparatus for preventing the re-routing of some sections of said communication link and speeding the resynchronization and retraining of the receiver of said destination modem, said apparatus comprising:

means for recognizing the beginning and end of the time periods when said source modem is awaiting a response from said destination modem or is receiving and decoding said response; and means for transmitting, during said periods, a holding signal that occupies a band or bands of frequencies separate from that occupied by said command signal.

6. The apparatus of claim 5 including means for constraining the data input to the transmitter of said source modem to be a simple repetitive pattern.

7. The apparatus of claim 5 including means for transmitting unmodulated carriers of a multicarrier set.

* * * * *